(No Model.) 2 Sheets—Sheet 2.
T. E. ADAMS.
ELECTRIC LOCOMOTIVE.
No. 476,437. Patented June 7, 1892.
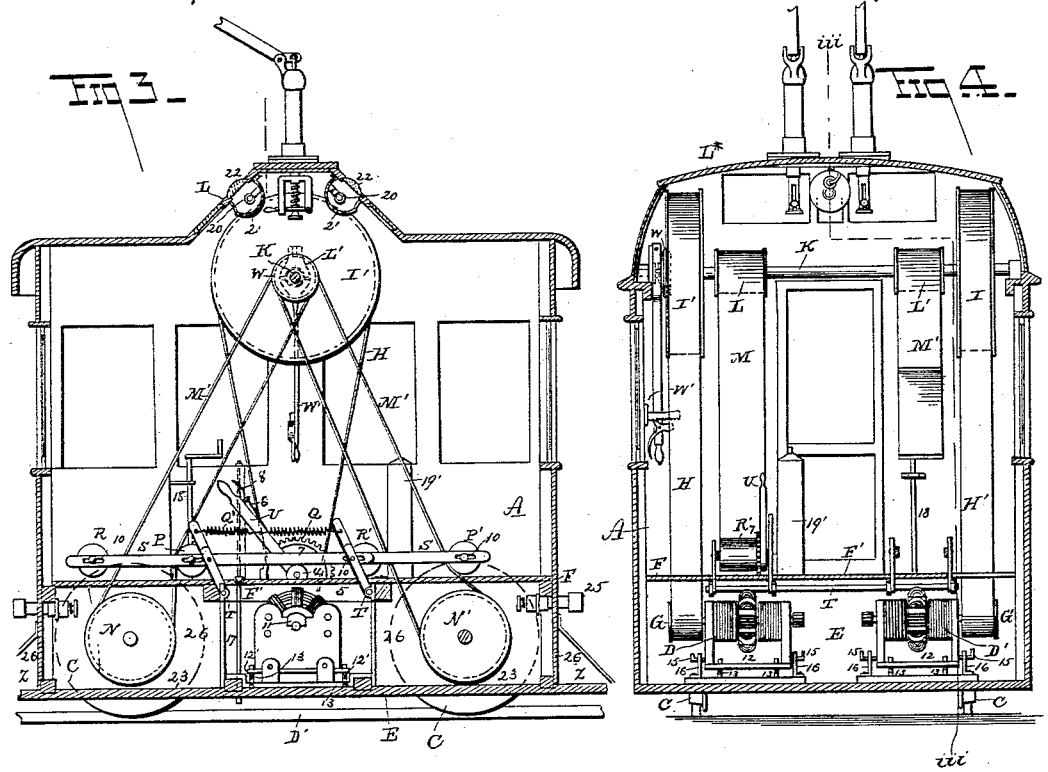
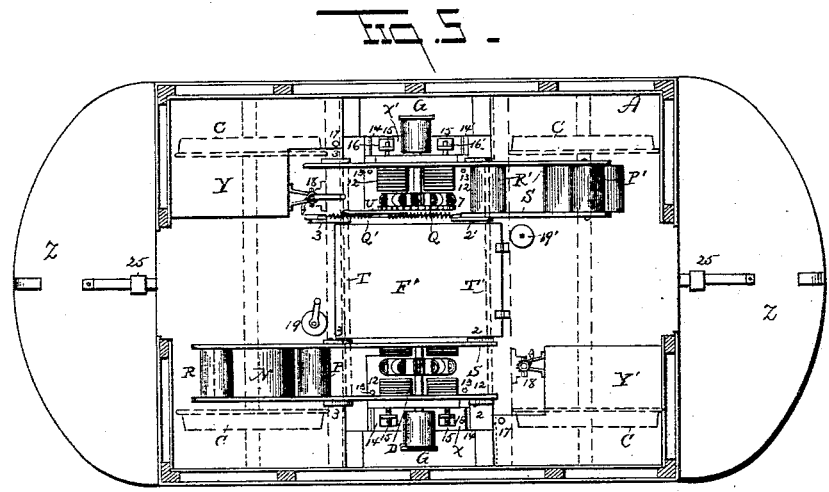
Witnesses:
S. G. Nottingham.
G. F. Downing.
Inventor
Thomas E. Adams.
By his Attorney

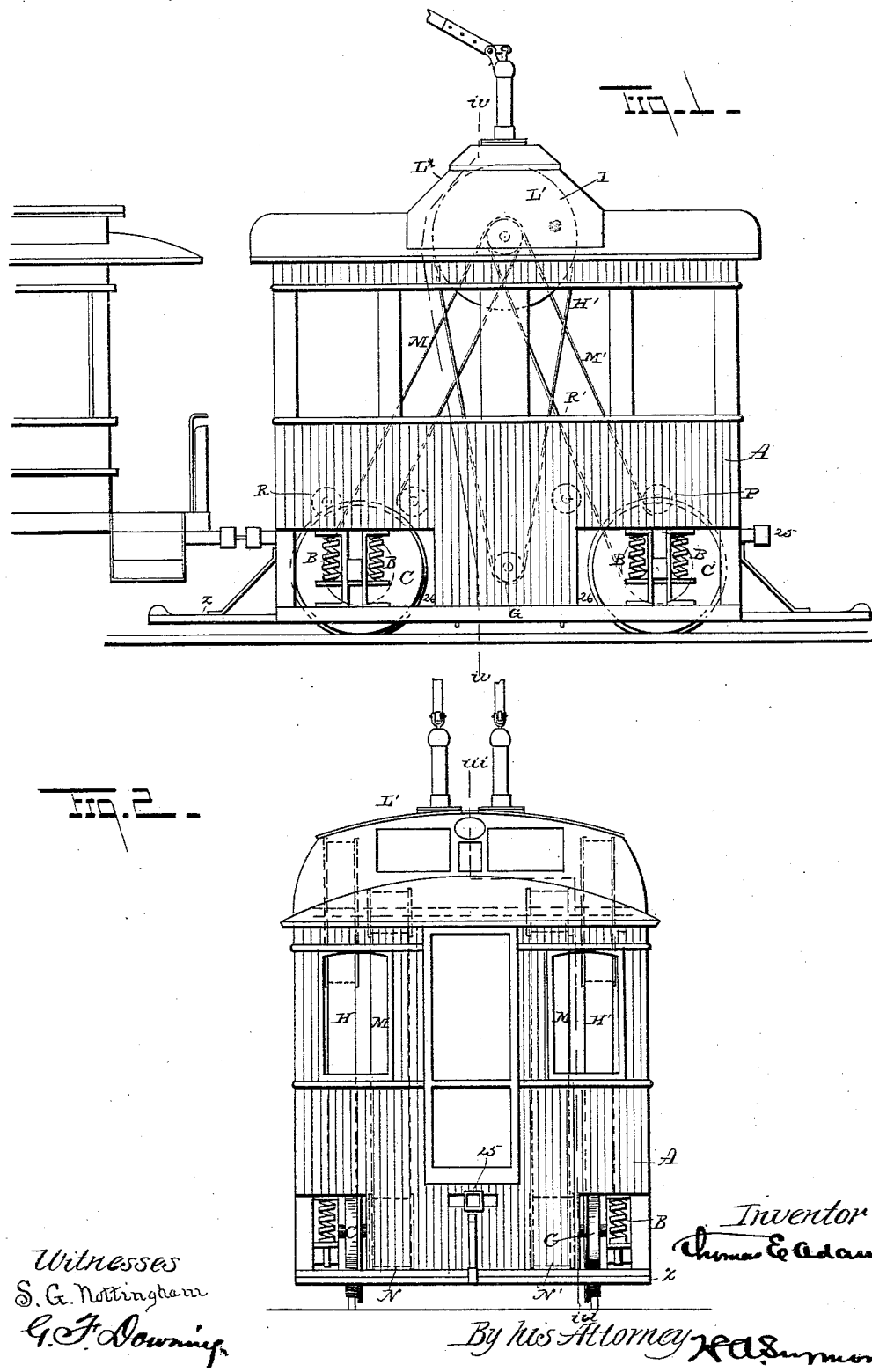

UNITED STATES PATENT OFFICE.

THOMAS E. ADAMS, OF CLEVELAND, OHIO, ASSIGNOR TO THE BRUSH ELECTRIC COMPANY.

ELECTRIC LOCOMOTIVE.

SPECIFICATION forming part of Letters Patent No. 476,437, dated June 7, 1892.

Application filed May 28, 1890. Serial No. 353,412. (No model.)

*To all whom it may concern:*

Be it known that I, THOMAS EDGAR ADAMS, of Cleveland, in the county of Cuyahoga and State of Ohio, have invented certain new and useful Improvements in Electrically-Propelled Vehicles or Electric-Railway Cars; and I do hereby declare the following to be a full, clear, and exact description of the invention, such as will enable others skilled in the art to which it appertains to make and use the same.

This invention relates more particularly to improvements in the means for supporting the electric motor or motors on electrically-propelled wheeled vehicles or cars and for connecting or gearing the same with the driving-wheels thereof, which new or improved means are applicable to cars propelled by electricity whether supplied from batteries on the motor-cars or through trolleys or travelers from an outside source over an overhead or an underground conductor or conductors; but it also comprises certain special constructions, improvements, or combinations in cars which are supplied through trolleys or travelers.

The new parts, improvements, or combinations constituting or comprised in the invention are included for all the uses to which they may severally be applicable.

The invention mainly consists in a new or improved belt-gearing for conveying the power from the electric motor or motors to the driving-wheels or wheel-base of the vehicle. Heretofore it has been customary to convey the power through cogged gearing, although other forms of gearing have been proposed. Cogged gearing, while possessing the advantage of compactness, is yet noisy in operation and very liable to breakage and not so economical as belts in the transmission of power. In the forms in most common use the cogged gearing remains in engagement even while the current is shut off and the car is descending a grade, so that the gearing continues to run and thus occasions unnecessary noise and wear. It also in these forms acts to hold back the car in descending grades or when the motor-car has to be drawn by horses or other outside power, as in the event of the motor mechanism becoming disabled. The rigidity of the system, moreover, makes it harder to start, and it takes longer time to throw the gears out of engagement than in the case of belts.

The advantage of belts to transmit power at high speed by reason of their durability, reliability, silence, cleanliness, and economy are matters of common knowledge. In the present new or improved belt-gearing these advantages are embodied in an eminent degree, and said gearing is further adapted to be readily thrown out of engagement when desired and permit the motor to be started first and the load then put upon it, which is a great advantage in starting the car on a heavy upgrade or a curve or when carrying a particularly heavy load. The new or improved gearing also has other advantages, some of which will be hereinafter mentioned.

The motor (or motors if more than one is desired) is mounted on the body of the car, which is supported on the axles of the car-wheels by means of springs in any ordinary or suitable way, and a quick-acting automatic slack-controller is employed to maintain under proper tension the belt or belts which run to the axle pulley or pulleys, notwithstanding variations in the distance of the said pulleys from their drivers in consequence of the motion of the car-body on the springs. Such an automatic slack-controller may of course be used with belts of various forms arranged in various ways, and may itself be made in different ways. The invention extends generally to the combination of it with other elements in an electrically-propelled vehicle in which the propelling power is conveyed through a belt or belts to one or more pulleys on the wheel-base. Moreover, so far as I am aware an automatic quick-acting slack-controller has never before been applied to a belt between pulleys on the wheel-base and spring-mounted body of a vehicle, respectively, so as to maintain a proper tension on the belt, notwithstanding the motion of the said body on its spring.

In connection with the belting for transmitting the power from the electric motor or motors to the wheel-base of the vehicle what may be termed a "reversible belt-tightener" is employed, consisting of a presser adapted to be held or pressed against either part of the belt between the pulleys, while the other part of the belt is left free. By this means the presser may be held against the slack part of the belt in whichever direction the vehicle may be traveling, leaving the belt on the taut or drawing part to extend directly from one pulley to the other. Preferably two idle-rollers are employed as pressers—one on the outside of each part of the belt—in connection with operating means such that both rollers may be withdrawn, leaving the belt free, or either roller may be pressed against the belt, so as to tighten it on the slack part.

So far as I am aware a reversible belt-tightener as above defined is new, not only in connection with the transmitting-belting of an electrically-propelled vehicle, but generally in connection with the belting and irrespective of the character of the pressure, whether elastic and yielding or rigid, by which the tightening device or roller is held against the belt, and the invention extends generally to such reversible belt-tightener and to the combination of the same with reversible belt-gearing in general, although the application to electrically-propelled vehicles is specially contemplated by and included in the invention.

The automatic quick-acting slack-controller for the belting between the pulleys on the spring-mounted vehicle-body and its wheel-base, respectively, may most usefully be formed by the reversible belt-tightener by employing suitable elastic or yielding means to hold the presser or pressers against the belting.

The belt or belts between the pulley (or pulleys) on the wheel-base and its driver (or drivers) is preferably arranged vertically with the driven wheel-base pulley under its driver and is combined with slackening means, such as the belt-tightener provided with means for relieving the pressure at will. By this arrangement when the vehicle is running down hill or is moved by means other than its own motor the belt can be slackened and will by its own weight drop away from the driven pulley, so that the wheels of the vehicle can rotate independently of their driving-gear. Preferably, also, the electric motor has its pulley under the pulley driven thereby, with which it is connected by a vertical belt and is provided with a removable cap above the journal of its armature, so that the weight of the motor is partly borne by the belt and tends to keep it taut, while the wear is mainly on the removable cap.

The invention also comprises various other new features of construction, combination, and arrangement, as hereinafter pointed out.

In the accompanying drawings, which form part of this specification, Figure 1 is a side elevation of an electric-motor car constructed in accordance with the invention and a portion of another car coupled thereto. Fig. 2 is an end view of the said motor-car. Fig. 3 is a longitudinal section of the same on line *iii* of Fig. 2. Fig. 4 is a cross-section on line *iv* of Fig. 1, and Fig. 5 is a horizontal section.

In all the upright views the upper part of the trolley-poles is broken away, and in Fig. 2 the platforms at the ends of the motor-car are also broken away.

The body A of the car is mounted through ordinary springs B on the wheel-base C of the vehicle, said base consisting of two pairs of wheels with their axles, as customary in the electric cars in use. The electrical motor or motors D D' (for two are shown) are mounted on the car-body A, which, as shown, is provided with a well or box E between the car-axles below the level of the ordinary floor F for receiving them. The armatures of the motors are each provided with a small pulley G G', which is connected by a belt H or H' with the large pulley I or I' on the counter-shaft K. This counter-shaft is mounted in the bearings in the roof of the car, which, as shown, is provided with a dome-like elevation L* to accommodate the pulleys I I'. On the counter-shaft K are fixed two small pulleys L L', from which belts M M' extend to larger pulleys N N' on the wheel-base—namely, one on each of the car-axles. The intermediate pulleys I I' L L' constitute a speed-reducing gear, so that the belts M M' travel more slowly than the belts H H'.

The belts M M', extending between pulleys on the car-body and pulleys on the wheel-base, require to give at every motion of the car-body A on its springs B, since this action alters the distance between the two sets of pulleys. To enable the belts to accommodate themselves to these changes and at the same time maintain their proper hold on the pulleys, a quick-acting automatic slack-controller is provided for each belt M M'. As shown, the slack-controller for each belt is formed of a presser or pressing roller P or P', which is held against the slack part of the belt by the yielding pressure of a spring Q. When the motion of the car is reversed, the other part of the belts of course become slack, and in order that a presser or pressing roller may be still held against the slack part of each belt additional rollers R R' are provided, which are held against the belts by the yielding pressure of the spring Q' and which constitute the slack-controller for the belts when the car travels in the opposite direction to that represented in the drawings. A pair of rollers is therefore employed for each belt, which latter is inclosed between them. Each pair of rollers is shown as mounted on a carrier-bar S or S', which is itself supported by the arms 2 and 2' or 3 and 3' of the rock-shafts T and T', so that the two carrier-bars may together be reciprocated longitudinally. In order to move them, the shifting-lever U is provided. It is fulcrumed in a block 4 on the beam 5 and is provided with a bolt 6, engaging the stationary notched sector 7, and with a bell-crank 8 for disengaging the bolt 6 from the sector 7.

From the shifting-lever the spiral tension-springs Q Q', above mentioned, extend to prolongations of the arms 3 and 3'. When, therefore, the shifting-lever U is moved toward either end of the car, it expands the springs Q and Q' on the opposite side, and the tension of said springs forces the carriers S S' and the rollers P R P' R' in the same direction, thus pressing a roller of each pair against the slack side of each belt, if we assume that the car is propelled in the opposite direction to the movement of the shifting-lever U. The two pairs of rollers P R and P' R' being connected with each other through the rock-shafts T T' it is obvious that the movements of one belt tend to modify the pressure of the roller against the other. This connection, if considered undesirable, may easily be avoided by duplicating the shifting-lever U and springs Q Q' and breaking the rock-shafts in the middle. As shown, the rollers are each mounted in a slot 10, so that they can be adjusted on their carriers. Preferably the rollers P R or P' R' of each pair are set at such distance apart that when the shifting-lever U is in the middle position neither roller presses against the belt, but the latter is left loose. At this time, owing to the vertical arrangement of the belts M M', these do not hug the pulleys N N', but drop away from them and permit the car to run down a grade or to be drawn by horses without interference from the gearing. It is possible, however, to arrange the rollers of each pair at such distance apart that they do not permit the belt to become slack in moving the shifting-lever U. The rollers may be adjusted on their carriers to compensate for stretching of the belts and other like source of variation.

It is desirable to permit the electric motors to rotate independently of the wheel-base and then to connect them therewith gradually. This may be done by means of the belt-tightener already described by placing the shifting-lever U in the middle position and when the motors have obtained the desired speed gradually moving said lever in the proper direction. It may also be done by means of friction or other clutches. As shown, the pulley I' is connected with the counter-shaft K by means of the friction-clutch W, which is operated by the lever W' to connect the pulley I' with said counter-shaft or to disconnect it therefrom. By means of this clutch the motor D can be disconnected, so as to put the whole work of driving the car on the motor D'. It thus may be made to serve as a supplementary motor, being brought into service in starting or running on an upgrade or whenever a large power is necessary. One or more clutches could of course be placed at other parts of the system.

The use of belt-gearing has great advantages over cogs in starting by first speeding the motor and then engaging the wheel-base, both because of its flexibility and the absence of backlash, as well as its ability to slip.

While the use of a supplementary motor has certain advantages, yet it may be dispensed with, one motor of sufficient power to operate the car and handle all loads being used. This single motor has, also, advantages over a larger number, which would render it generally preferable, and among which may be mentioned its cheaper first cost and less liability to small but annoying breaks and derangements.

As shown, the motors D D' are each provided with a pulley G or G' on the armature-shaft in the lower bend or bight of the belt H or H', and consequently the weight of the machine is supported in part by said belt and tends to keep the same stretched. Above the armature-shaft is a removable cap 11, whose under side constitutes the principal wearing-surface. As the cap is removable, it is easy to renew the same when worn. In order to put an adjustable tension on the belts H H', the motors D D' are each made vertically adjustable, and to make the belts track properly they are each horizontally adjustable transversely to the length of the belts. As shown, the frame of each motor has ears 12 or 12', through which are tapped the adjusting-screws 13 or 13', whose lower ends engage slots 14 or 14' in the base-plate X or X'. By turning the screws the motor can be raised or lowered. To adjust the motor longitudinally or horizontally, screws 15 or 15' are tapped through ears 16 or 16' on the base-plate and bear at the ends against the motor-frame.

The vertical adjustment of the belts is advantageous for the reasons already stated, and also because of the economy of floor-space which it secures. By having the counter-shaft and speed-reducing pulleys in the roof of the car comparatively long belts are obtainable, and the placing of the motors below the ordinary floor-level enables the belts H H' to be made longer, as well as removes the motors out of the way and enables the flooring above them to serve for the standing of the motor-driver or for other ordinary purposes.

The pulleys and belts are arranged at the sides of the car, so as to leave a space or passage in the middle of the car. In order to give access to the motors from within the car, the flooring at F' over the well or box E is made removable by hinging or otherwise. It is preferred to leave the space on either side of this flooring open, so that the motor-driver or other person in charge can inspect at all times the working of the machinery; but said space may of course be covered over.

At Y and Y' are shown ballasting sand-boxes—that is to say, sand-boxes of such weight that they materially increase the weight of the motor-car. From each of the boxes a conduit or passage 17 or 17' serves to conduct the sand onto the rails when it is desired to use it.

It is preferred to have the motor-driver's position in the middle of the car under the dome-like elevation L*. Brake-shafts 18 and 18' and rotary switch and rheostatic apparatus 19 and 19' are therefore indicated convenient to the motor-driver in such position.

The dome-like elevation L* is provided with openings through which the motor-driver can observe the line near the car, both in front of the same and also behind it where the trolleys travel. A lamp 20, with its reflector 21 and lens or bull's-eye 22, is shown at each end of the dome-like elevation, so arranged as to illuminate the line or overhead conductors (not shown) through which the electricity is supplied to the car.

The floor of the well or box E, which lies near the ground, is preferably extended under the axles, as at 23, and is made strong and is strongly connected with the car-body, so as to form a solid flat bottom, which will support the car in case it should run off the track onto soft ground, and will thus prevent the wheels from sinking in deeply. It will therefore enable the car more readily to be replaced on the track. The floor or solid bottom may be recessed or cut away under the large pulleys N N' on the car-axles, so as not to strike the same when the car-body moves on its springs, and sides 26 may make a box around the pulleys.

At each end of the car in the plane of the solid bottom is a platform Z, which not only forms a step from which one can enter the doors in the ends of the car, but also serves as a guard to prevent objects from getting under the wheels. Should it strike a person, the latter would naturally fall on the platform out of harm's way. It is rounded at the ends, so as to force off the track objects which do not fall onto the platform. It is well suited to locomotive-cars or motor-cars for drawing other cars, as it projects beyond the couplers 25, and when the car to be drawn is coupled on it extends under the platform of such car, as shown in Fig. 1.

The car shown is a motor-car without means for carrying passengers. The invention is applicable, also, to passenger-vehicles.

Parts of the car not shown—such as the brushes for the motors, the electrical connections, the brake mechanism, and the like—may be of any ordinary or suitable construction.

Having fully described my invention, what I claim as new, and desire to secure by Letters Patent, is—

1. The combination, with the spring-mounted car-body and wheel-base, of pulleys in the upper portion of the car-body, pulleys on the wheel-base, belting for transmitting motion to the pulleys in the upper portion of the car-body, and belting connecting said pulleys with the pulleys on the wheel-base, substantially as set forth.

2. The combination, with the spring-mounted car-body and the wheel-base, of the propelling electric motor or motors on said body, the belting from the motor shaft or shafts to speed-reducing pulleys or intermediates on the car-body and from said reducing-pulleys to the wheel-base, and the quick-acting automatic slack-controller for the belting, substantially as described.

3. The combination, with the wheel-base and the spring-mounted car-body provided with a well or box below the ordinary floor-level, of the motor or motors in said well or box, the pulleys in the roof, the belting, and the quick-acting automatic slack-controller, substantially as described.

4. The combination, with a wheel-base and a car-body provided with a well or box below the ordinary floor-level, of the motor or motors in the said well or box, the pulleys in the car-roof, and the vertical belts, substantially as described.

5. The combination, with a wheel-base and a car-body provided with a well or box below the ordinary floor-level and a removable flooring over said well or box, of an electric motor or motors in said well or box, pulleys in the roof of the car and on the motor or motors and wheel-base, and vertical belts, substantially as described.

6. An electrically-propelled vehicle in which the electricity is supplied from an overhead line and the mechanical power is conveyed to the wheel-base through belt-gearing and in which also the car-body is provided with a dome-like elevation in the roof adapted for observing the line near the car and having a part of the belt-gearing arranged therein, substantially as described.

7. The combination, with a vertical belt and a vertically-adjustable motor, of ears on the base-plate of said motor and adjusting-screws passing through said ears and bearing on the motor-frame, whereby the motor may be moved horizontally, substantially as set forth.

8. In combination with the motor or motors and belt-gearing of an electrically-propelled vehicle having intermediate or speed-reducing pulleys in the roof connected by vertical belts with said motor or motors, motor-adjusting means for vertically adjusting said motor or motors, substantially as described.

9. In combination with the motor or motors, wheel-base, and belt-gearing of an electrically-propelled vehicle capable of traveling in either direction, a reversible belt-tightener having a presser or roller for bearing against whichever part of the belt tends to become slackened, according to the direction of the travel, substantially as described.

10. In combination with a wheel-base and belt-gearing, a reversible belt-tightener, substantially as described.

11. In combination with a belt for transmitting power with reversals of the motion, a reversible belt-tightener, substantially as described.

12. The combination, with a spring-mounted car-body, the wheel-base, and the belt-gearing between pulleys on the wheel-base and car-body, respectively, of a reversible belt-tightener constituting a quick-acting automatic slack-controller and having a yielding presser or pressing roller for bearing against whichever part of the belt tends to become slackened, according to the direction of the car's motion, substantially as described.

13. In combination with the spring-mounted car-body, the propelling electric motor or motors, the wheel-base, and the belt-gearing between the electric motor or motors and the wheel-base, the automatic slack-controller in the form of a reversible belt-tightener with yielding pressure or pressing rollers, substantially as described.

14. In combination with a belt, the reversible belt-tightener comprising rollers on opposite sides of the belt, springs, and mechanical connections, whereby a roller may be pressed by yielding pressure against either part of the belt, leaving the other free, substantially as described.

15. In combination with a belt, the reversible belt-tightener comprising rollers on opposite sides of the belt, springs, and mechanical connections, whereby the belt may be tightened from either side or left loose, substantially as described.

16. In combination with a belt, a reversible belt-tightener comprising a pair of pressers or pressing rollers, a carrier for the said pressers or pressing rollers, and a shifting-lever, substantially as described.

17. The combination, with a wheel-base, spring-mounted car-body, propelling motor or motors, and the belt-gearing, of a reversible belt-tightener constituting a quick-acting automatic slack-controller and comprising a pair of pressing rollers with their carrier, springs, and shifting-lever, substantially as described.

18. The combination, with the wheel-base, the car-body, and the counter-shaft, of the two motors geared to said shaft, clutch mechanism whereby one or both of said motors may be made to engage said counter-shaft, and gearing between the counter-shaft and wheel-base, substantially as described.

19. The combination, with an electrically-propelled vehicle, of a stout frame having its lower portion extending below the axles of the vehicle immediately over the tread of the rails, a floor located on said frame over the axles, and an electric motor supported by said frame under said floor, substantially as set forth.

20. The combination, with an electrically-propelled car, of a stout frame located under the axles thereof and extending from one end to the other of said car and platforms secured at the ends of said frame and projecting therefrom in the same plane as the lower portion of said frame, said platforms being of a length sufficient to project beyond the coupler at the end of said electrically-propelled car and beneath and beyond the end of the platform of the adjacent car to which said electrically-propelled car is coupled, substantially as set forth.

21. The herein-described electrically-propelled vehicle, comprising the wheel-base, the spring-mounted car-body provided with a stout frame below the axles and an ordinary floor above the axles, an electric motor or motors in the space between said frame and floor, a counter-shaft in the roof of the car-body, belting between the motor or motors and counter-shaft and between the counter-shaft and wheel-base, and the reversible belt-tightener with quick-acting yielding pressers and a shifting-lever, substantially as described.

In testimony whereof I have signed this specification in the presence of two subscribing witnesses.

THOMAS E. ADAMS.

Witnesses:
A. B. CALHOUN,
C. J. LEEPHART.